US006961829B2

(12) United States Patent
Preishuber-Pfluegl

(10) Patent No.: US 6,961,829 B2
(45) Date of Patent: Nov. 1, 2005

(54) DATA CARRIER COMPRISING MEMORY MEANS FOR STORING INFORMATION SIGNIFICANT FOR INTERMEDIATE OPERATING STATES

(75) Inventor: Josef Preishuber-Pfluegl, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 681 days.

(21) Appl. No.: 10/161,751

(22) Filed: Jun. 4, 2002

(65) Prior Publication Data

US 2002/0186789 A1 Dec. 12, 2002

(51) Int. Cl.$^7$ ............................................. G06F 12/00
(52) U.S. Cl. .................. 711/154; 340/10.1; 340/572.3; 235/436; 235/375
(58) Field of Search ....................... 711/154, 150, 151, 711/156, 163; 340/572.3, 10.2, 10.1, 10.3; 235/375, 436; 375/316

(56) References Cited

U.S. PATENT DOCUMENTS

| | | | | |
|---|---|---|---|---|
| 5,485,154 A | * | 1/1996 | Brooks et al. | 342/44 |
| 5,539,394 A | * | 7/1996 | Cato et al. | 340/10.32 |
| 5,966,082 A | | 10/1999 | Cofino et al. | 340/825.54 |
| 6,097,292 A | | 8/2000 | Kelly et al. | 340/572.7 |
| 2002/0186789 A1 | * | 12/2002 | Preishuber-Pfluegl | 375/316 |

FOREIGN PATENT DOCUMENTS

EP 0973127 A2 7/1999 ........ G06K 19/073

OTHER PUBLICATIONS

"ISO/IEC 18000-3-1: Automated Identification—Radio Frequency Identification for Item Management—Communications and Interfaces—Part 3: Physical Layer, Anti collision System and Protocol Values at 13:56 MHz mode 1", © ISO 1999, p. i-99.*
ISO/IEC 18000-3-5 of Mar. 1, 2002 with reference No. ISO/WD 18000-3-v40-5.

* cited by examiner

Primary Examiner—Brian R. Peugh
(74) Attorney, Agent, or Firm—Adam L. Stroud

(57) ABSTRACT

A data carrier (2) or an integrated circuit (41) for a data carrier (2) comprises a memory (54) which is designed to store intermediate operating state information (ZS, CI16, CI20, BRS) significant for an intermediate operating state of the data carrier (2) or the integrated circuit (41) and comprises a memory control device (51), which after the occurrence of information significant for intermediate operating states ensures that this intermediate operating state information is stored in the memory (54) and comprises a control device (51), which—after the detection of the non-existence of the supply voltage (V) required for faultless operation during execution of a communication sequence interrupted by this non-existence and the subsequent detection of the re-existence of the supply voltage (V)—ensure that the data carrier (2) or the integrated circuit (41) is controlled in an intermediate operating state for which intermediate operating state information (ZS, CI16, CI20, BRS) stored in the memory (54) is significant.

16 Claims, 3 Drawing Sheets

DATA CARRIER COMPRISING MEMORY MEANS FOR STORING INFORMATION SIGNIFICANT FOR INTERMEDIATE OPERATING STATES

The invention relates to a data carrier and an integrated circuit for a data carrier, comprising communication means for communication with at least one communication station in accordance with a communication sequence executed during the communication, the communication sequence comprising several communication steps, and in the data carrier an intermediate operating state occurs as a result of a communication step of specific communication steps and in the data carrier intermediate operating state information significant for an intermediate operating state of specific intermediate operating states occurs, and the data carrier comprising detection means to detect the existence of at least one operating variable required for the operation of the data carrier or the integrated circuit.

Such a data carrier and an integrated circuit for a data carrier were disclosed in the proposal for a standard ISO/IEC 18000-3-5 of Mar. 1, 2001 with reference number ISO/WD 18000-3-v40-5 and are therefore known. According to the proposed known embodiments, it is envisaged that after the execution of a communication sequence between a communication station and a data carrier or an integrated circuit for a data carrier of this type, characteristic information for an final operating state attained will be stored in a memory; to be precise by means of a stop command being transmitted from this communication station to the data carrier or the integrated circuit with the stop command resulting in the stoppage of the data carrier in question or the integrated circuit in question, so that in this idle state it is impossible for the data carrier or the integrated circuit to react to a prompt command from this communication station which is described in the aforesaid proposal for a standard in clause 6.5.3.2.3.2.3—"Fully Muted Reply Mode".

With the known data carrier or with the known integrated circuit, it is a fact that the communication station is regularly repeatedly deactivated and re-activated so that a condition could occur when during a communication in accordance with a communication sequence, during the execution of the communication sequence, the deactivation of the communication station results in the absence of the supply voltage in the data carrier or in the integrated circuit which results in that only a specific intermediate operating state is achieved during of the execution of the communication station sequence, but not a desired final operating state, with the information on the attainment of the specific intermediate operating state by the known data carrier or the known integrated circuit being disadvantageously lost due to the absence of the supply voltage. The result of this is that when the communication station is re-activated, the known data carrier has to start a previously interrupted communication sequence again from the beginning. Disadvantageously, this results in that relatively often the adverse circumstance occurs that much more time is required for complete communications between a communication station and numerous known data carriers than is the case when the communication station remains permanently activated.

It is an object of the invention to rectify the aforesaid problems and realize an improved data carrier and an improved integrated circuit.

To achieve the aforesaid object, a data carrier in accordance with the invention is provided with features in accordance with the invention so that a data carrier in accordance with the invention may be characterized in the following way, namely:

a data carrier comprising communication means for communication with at least one communication station in accordance with a communication sequence executed during the communication, the communication sequence comprising several communication steps, and in the data carrier an intermediate operating state occurs as a result of a communication step of specific communication steps, and in the data carrier intermediate operating state information significant for an intermediate operating state of specific intermediate operating states (ZS, CI16, CI20, BRS) occurs, and the data carrier comprising detection means to detect the existence of at least one operating variable (V) required for the operation of the data carrier and the data carrier comprising memory means for storing information, the memory means being designed for storing the intermediate operating state information (ZS, CI16, CI20, BRS) significant for an intermediate operating state, and the data carrier comprising memory control means which are designed so that after the occurrence of an intermediate operating state information (ZS, CI16, CI20, BRS) significant for an intermediate operating state they ensure that this intermediate operating state information (ZS, CI16, CI20, BRS) significant for an intermediate operating state is stored in the memory means, and the data carrier comprising control means, which are designed so that—after the detection of the non-existence of the at least one operating variable (V) during the interrupted execution of the communication sequence due to this non-existence of the at least one operating variable (V) and the subsequent detection of the re-existence of the at least one operating variable (V) by the detection means—they ensure that the data carrier is controlled in an intermediate operating state for which intermediate operating state an intermediate operating state information (ZS, CI16, CI20, BRS) stored in the memory means is significant.

To achieve the aforesaid object, an integrated circuit in accordance with the invention is provided with features in accordance with the invention so that an integrated circuit in accordance with the invention may be characterized in the following way, namely:

an integrated circuit for a data carrier comprising communication means for communication with at least one communication station in accordance with a communication sequence executed during the communication, the communication sequence comprising several communication steps, and in the integrated circuit an intermediate operating state occurs as a result of a communication step of certain communication steps, and in the integrated circuit intermediate operating state information significant for an intermediate operating step of specific intermediate operating states (ZS, CI16, CI20, BRS) occurs, and the integrated circuit comprising detection means to detect the existence of at least one operating variable (V) required for the operation of the integrated circuit, the integrated circuit, and the integrated circuit comprising memory means for storing information, the memory means being designed for storing the intermediate operating state information (ZS, CI16, CI20, BRS) significant for an intermediate operating state, and the integrated circuit comprising memory control means which are designed so that after the occurrence of an intermediate operating state information (ZS, CI16, CI20, BRS) significant for an intermediate operating state they ensure that this intermediate operating state information (ZS, CI16, CI20, BRS) significant for an intermediate operating state is stored in the memory means, and the integrated circuit comprising control means, which are designed so that—after the detection of the non-existence of the at least one operating variable (V) during the interrupted execution of the communication sequence due to this non-existence of the at least one operating variable (V) and the subsequent detection of the re-existence of the at least one operating variable (V) by the detection means—they ensure that the integrated circuit is controlled in an intermediate operating state for which intermediate operating state an intermediate operating state information (ZS, CI16, CI20, BRS) stored in the memory means is significant.

The provision of the features in accordance with the invention is a simple way in terms of circuit engineering and for only a low extra cost of ensuring that with a data carrier in accordance with the invention and with an integrated circuit in accordance with the invention information on the attainment of specific intermediate operating states during the execution of a communication sequence may be stored, so that on the failure of an operating variable required for the faultless operation of the data carrier or the integrated circuit, information that an intermediate operating state had already been attained is retained and consequently, when the operating variable required for the faultless operation of the data carrier or integrated circuit is present again, it is possible in a simple way to return the data carrier or integrated circuit immediately to the intermediate operating state previously attained. This is a simple way of avoiding the need to start the partially executed communication sequence again from the beginning following the failure or absence of an operating variable required for the faultless operation of the data carrier during the execution of a communication sequence. This ensures much shorter overall communication times between a communication station and numerous data carriers in communications links with this communication station.

With a data carrier in accordance with the invention or an integrated circuit in accordance with the invention, the detection means to detect the existence of at least one operating variable necessary for the operation of the data carrier or the integrated circuit may be designed to detect a field strength acting on the data carrier or the integrated circuit. It has been found to be particularly advantageous if the detection means are designed for detecting the existence of a sufficiently high supply voltage for the operation of the data carrier or the integrated circuit. An embodiment of this type is characterized by the fact that it is particularly simple to achieve in terms of circuit engineering.

With a data carrier in accordance with the invention or with an integrated circuit in accordance with the invention, it has been found to be particularly advantageous if the control means are designed so that the data carrier or the integrated circuit is controlled in this intermediate operating state for which intermediate operating state the significant intermediate operating state information was stored as the last intermediate operating state information in the memory means before the detection of the non-existence of the at least one operating variable. This guarantees particularly short overall communications times. However, it is explicitly established that with a data carrier in accordance with the invention or an integrated circuit in accordance with the invention, it may also be advantageous in certain circumstances, to control the data carrier or the integrated circuit in an intermediate operating state for which the significant intermediate operating state information was stored not as the last, but as the last but one or even earlier intermediate operating state information. It is also possible to control a data carrier of this type or an integrated circuit of this type in an intermediate operating state, whose intermediate operating state information had not even occurred before the detection of the non-existence of the at least one reference variable and which corresponds to an intermediate operating state only possible after the detection of the non-existence of the at least one reference variable.

With a data carrier or an integrated circuit in accordance with the invention, it has been found to be particularly advantageous if the control means are designed so that the data carrier or the integrated circuit is controlled in at least one intermediate operating state occurring during the course of the execution of an anticollision procedure. This embodiment is particularly advantageous because in particular the execution of an anticollision procedure takes a relatively long time within a communication sequence and because therefore the constant re-starting of a communication sequence and, hence the re-starting of an anticollision procedure, as is the case with the known data carrier or the known integrated circuit, represents a relatively large waste of time, which is advantageously avoided in the data carrier in accordance with the invention or the integrated circuit in accordance with the invention, because, due to the provision of the measures in accordance with the invention, an anticollision procedure interrupted during the course of a communication sequence after a completed communication step may be continued again after the completed communication step.

With a data carrier or an integrated circuit in accordance with the invention, it has also been found to be very advantageous if the control means are designed so that the data carrier or the integrated circuit is controlled in an intermediate operating state occurring as a result of the execution of a password procedure. The execution of a password procedure is relatively often an important step in the execution of a communication sequence which is why it is advantageous to continue a communication sequence after an already executed password procedure if it should be necessary.

With regard to the embodiment of the memory means to store the significant intermediate operating state information, it has been found to be very advantageous if the memory means being formed by a FRAM. Advantageously, memory means of this type may be recorded rapidly and comprise the information stored in them in a non-volatile way.

With regard to the embodiment of the memory means to store the significant intermediate operating state information, however, it has also been found to be advantageous if the memory means comprising at least two memory stages, each comprising a capacitive cell, and the two memory stages are suitable for the time-limited storage of the intermediate operating state information significant for an intermediate operating state. A solution of this type known per se is also very advantageous in relation to a data carrier in accordance with the invention or an integrated circuit in accordance with the invention.

With regard to the memory means, it should also be mentioned that other memory means which may be recorded as rapidly as possible and store information in a non-volatile way may be used, for example a battery-buffered or capacitor-buffered SRAM or DRAM, or even simple flip-flop stages.

It has also been found to be particularly advantageous with a data carrier in accordance with the invention and an integrated circuit in accordance with the invention if erasing means are provided, by which erasing means the memory means to store the significant intermediate operating state information may be erased. An embodiment of this type has been found to be particularly advantageous if the memory means are formed by a FRAM.

The aforesaid aspects and further aspects of the invention may be derived from the following examples of embodiment and are described using these examples of embodiment.

The invention will be further described with reference to examples of embodiment shown in the drawings to which, however, the invention is not restricted.

Figure 1:
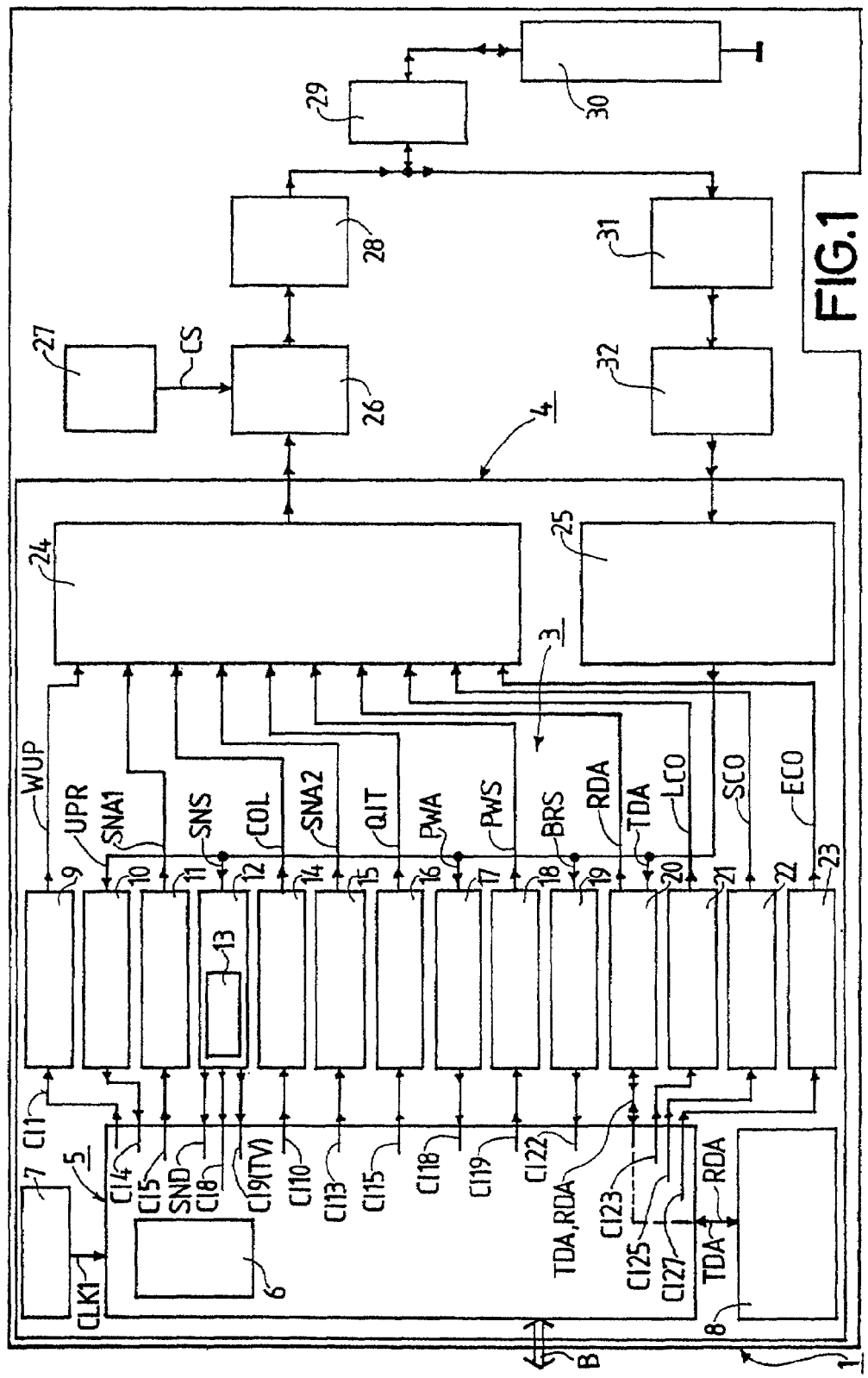
FIG. 1 shows in a schematic way in the form of a block diagram a communication station for communication with a data carrier in accordance with a first example of embodiment of the invention, which is shown in FIG. 2.

FIG. 1 shows a communication station 1. The communication station 1 is provided and designed for communication with a data carrier 2, with the data carrier 2 being shown in FIG. 2 and being described in detail in the following. The communication station 1 comprises communication means 3, whose embodiment is described in detail in the following. The communication means 3 are designed for communication with the data carrier 2 in accordance with a communication sequence executed with communications of this type, with the communication sequence comprising several communication steps which are described in more detail in the following.

The communication station 1 comprises a microcomputer 4. Instead of a microcomputer 4, a wired logic circuit could also be provided.

The microcomputer 4 comprises sequence control means 5, which are connected by a bus link B to a host computer and by which numerous means realized by the microcomputer 4 may be controlled. The sequence control means 5 comprise switching means 6, with the aid of which the communication station 1, and consequently the execution of a communication sequence, may be deactivated and re-activated, even during the execution of a communication sequence of this type, with it being realized in the communication station 1 in a way not described in any further detail that on the deactivation of the communication station 1 no signal, i.e. even no carrier signal, which will be dealt with in greater detail in the following, is issued by the communication station 1 and hereby transmitted to a data carrier.

The microcomputer 4 also comprises clock signal generating means 7 by which a clock signal CLK1 may be generated, which is fed to the sequence control means 5. In addition, the microcomputer 4 comprises memory means 8, by which data and other information may be stored. The memory means store station data RDA. Data carrier data TDA may also be stored in the memory means 8.

In addition, by aid of the microcomputer 4 numerous means may be realized, which means are described in the following.

By aid of the microcomputer 4 wake-up signal generating means 9 are realized to which generating means 9 control information CI1 may be fed from the sequence control means 5 and which are designed to generate a wake-up signal WUP.

By aid of the microcomputer also wake-up response signal detection means 10 are realized to which a wake-up response signal UPR may be fed and by which control information CI4 may be generated, which may be fed to the sequence control means 5.

In addition, by aid of the microcomputer 4 first serial number inquiry signal generating means 11 are realized to which control information CI5 may be fed from the sequence control means 5 and by which a first serial number inquiry signal SNA1 may be generated.

In addition, by aid of the microcomputer 4, serial number signal detection means 12 comprising collision detection means 13 are realized. To the serial number signal detection means 12 may be fed a serial number signal SNS. By the serial number signal detection means 12, either serial number data SND or control information CI8 or control information CI9 may be generated and sent to the sequence control means 5. The control information CI8 occurs if the collision of at least two serial number signals SNS has been detected by the collision detection means 13. The control information CI9 occurs if after the detection of a collision between at least two serial number signals SNS by the collision detection means 13 and after the elapse of a specific time TV no serial number was detected or determined by the serial number signal detection means 12. The serial number data SND and the two types of control information CI8 and CI9 may be fed to the sequence control means 5.

By aid of the microcomputer, in addition, collision display signal generating means 14 are realized to which control information CI10 may be fed from the sequence control means 5 and by which a collision display signal COL may be generated.

In addition, by aid of the microcomputer 4 second serial number inquiry signal generating means 15 are realized to which control information CI13 is fed from the sequence control means 5 and by which a second serial number inquiry signal SNA2 may be generated.

In addition, the aid of the microcomputer 4 acknowledgment signal generating means 16 are realized to which control information CI15 is fed from the sequence control means 15 and by which an acknowledgment signal QIT may be generated.

In addition, the aid of the microcomputer 4 password inquiry signal detection means 17 are realized to which a password inquiry signal PWA may be fed and by which control information CI18 may be generated, which may be fed to the sequence control means 5.

In addition, by aid of the microcomputer 4 password signal generating means 18 are realized to which control information CI19 is fed from the sequence control means 5 and by which a password signal PWS may be generated.

In addition, by aid of the microcomputer 4 standby signal detection means 19 are realized to which a standby signal BRS may be fed and which are designed to generate control information CI22, which may be may be fed to the sequence control means 5.

In addition by aid of, the microcomputer 4 data processing means 20 are realized, which are provided and designed for processing data, to be precise for processing station data RDA and for processing data carrier data TDA.

In addition, by aid of the microcomputer 4 read command generating means 21 are realized to which control information CI23 may be fed from the sequence control means 5 and by which a read command LCO may be generated.

In addition, by aid of the microcomputer 4 write command generating means 22 are realized to which control information CI25 may be fed from the sequence control means 5 and by which a write command SCO may be generated.

In addition, by aid of the microcomputer 4 erase command generating means 23 are realized to which information CI27 may be fed from the sequence control means 5 fed and by which an erase command ECO may be generated.

By aid of the microcomputer 4 also other means are realized, for example, idle command generating means and also several other means, which are not dealt with in more detail here.

As mentioned above, the communication station 1 comprises communication means 3 for communication with at least one data carrier 2. In this case, the communication means 3 comprise the sequence control means 5 and the means 9 to 23 described above.

In addition, by aid of the microcomputer 4 encoding means 24 and decoding means 25 are realized. The encoding means 24 are provided and designed to encode the signals fed to them, where it should be noted that the signals fed to the encoding means 24 for encoding WUP, SNA1, COL SNA2, QIT, PWS, RDA, LCO, SCO and ECO represent digital data that are subjected to encoding by the encoding means 24. The decoding means 25 are provided and designed for decoding the signals fed to the decoding means 25 in encoded form, so that in this case, the decoding means send the signals UPR, SNS, PWA, BRS and TDA.

In addition, the communication station 1 comprises modulation means 26, which are downstream from the encoding means 24. In addition, a carrier signal generator 27 is provided, by which a carrier signal CS may be generated, which is fed to the modulation means 26 and which is modulated in relation to the signals sent by the encoding means 24, with in this case, amplitude modulation being performed. However, means to perform frequency modulation, or phase modulation or even another type of modulation could also be provided. Downstream from the modulation means 26, there is a first amplifier 28, whose output signals are fed to adaptation means 29, from which adaptation means the amplified signals are forwarded to transmission means 30. The transmission means 30 are used to transmit signals fed to them to the transmission means of the data carrier 2, which is dealt with in further detail in the following. In this case, the transmission means 30 comprise a transmission coil, which may be coupled by means of a transformer to a transmission coil in the transmission means of the data carrier 2. The transmission means 30 may, however, also be designed with a capacitive action. The transmission means 30 may also be designed as an antenna and work by transmitting electromagnetic waves.

The transmission means 30 are not used solely to transmit signals, but also to receive signals, with received signals being fed through the adaptation means 29 to a second amplifier 31 in communication station 1. The second amplifier 31 comprises downstream demodulation means 32, with the decoding means 25 being connected to the demodulation means 32. In this case, the demodulation means 32 are designed to demodulate load-modulated signals, which are obtained by load modulation of the unmodulated carrier signal CS generated by the carrier signal generator 27, which has been known for a long time in specialist circles and will therefore not be dealt with in any more detail here.

Figure 2:
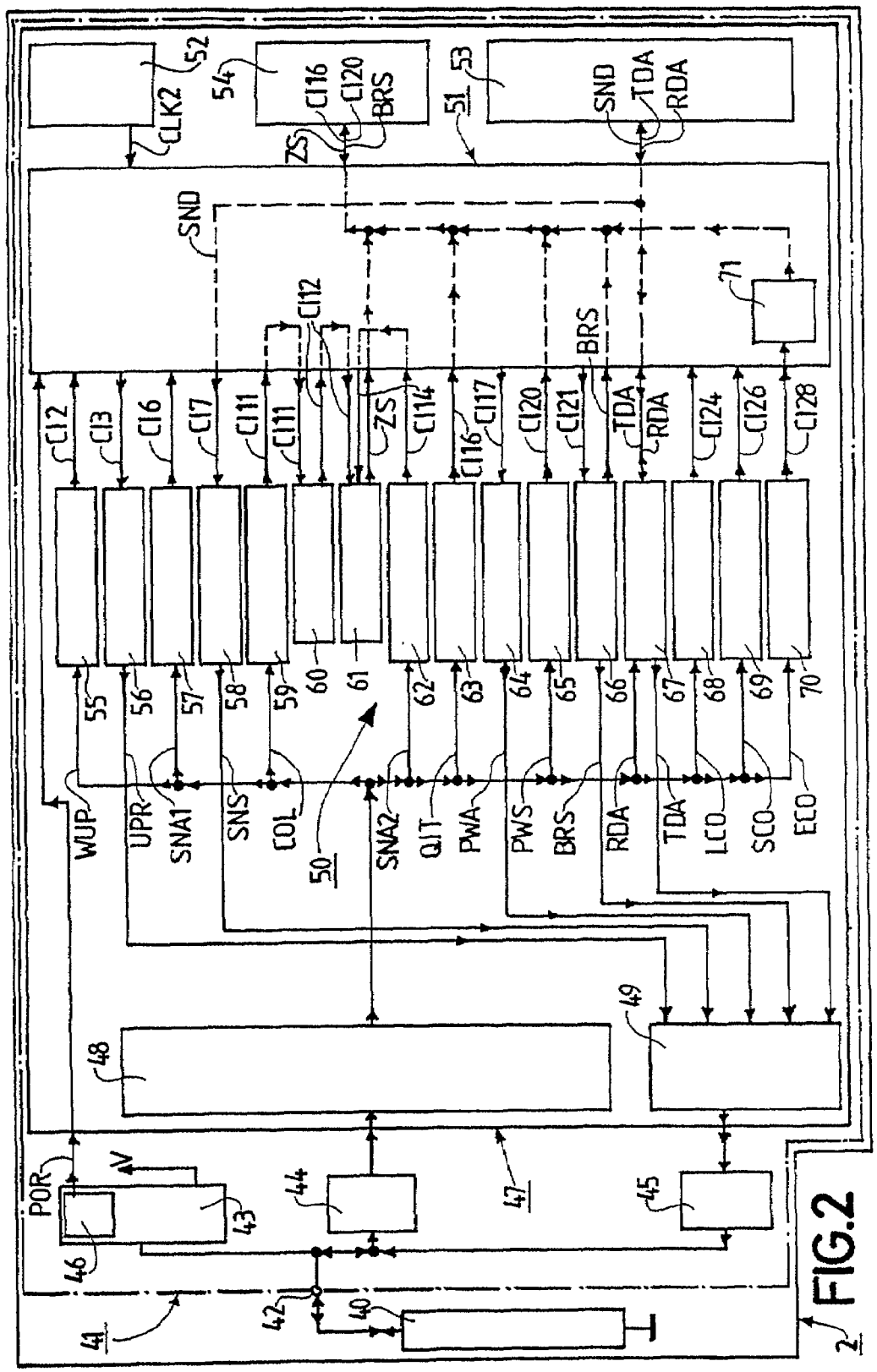
FIG. 2 shows a data carrier in accordance with a first example of embodiment of the invention, which is designed for communication with the communication station 1 in accordance with FIG. 1 and has a FRAM as the memory means to store significant intermediate operating state information.

The following describes in detail the embodiment of the data carrier 2 in accordance with FIG. 2.

The data carrier 2 comprises transmission means 40, which are designed for communication with the transmission means 30 in the communication station 1. The data carrier 2 also comprises an integrated circuit 41, which is provided with a port 42 to which the transmission means 40 are connected. The port 42 is connected to internal circuit supply voltage generating means 43, demodulation means 44 and modulation means 45. The supply voltage generating means 43 are provided and designed to generate a supply voltage V using the signal provided by the transmission means 40 to the port 42. The supply voltage V may be fed to all components of the integrated circuit 41 requiring this supply voltage V, but to avoid complicating the drawing, which is not shown in FIG. 2.

The supply voltage generating means 43 comprise so-called power-on detection means 46, which are provided to detect the existence of an operating variable necessary for the operation of the data carrier 2 and to be precise in this case to detect the existence of a supply voltage V necessary for the faultless operation of the data carrier 2 or the integrated circuit 41. If the supply voltage generating means 43 issue a supply voltage V necessary for a faultless operation, the power-on detection means 46 issue a characteristic signal, namely a so-called power-on-reset signal POR with a high level. If the supply voltage generating means 43 do not issue a sufficiently high supply voltage V for faultless operation, the power-on-reset signal POR is absent or the power-on-reset signal changes from the previously high level to a subsequently low level.

The demodulation means 44 are provided and designed for the demodulation of the signals fed to them from the port 42, with the signals being sent by the communication station 1.

The modulation means 45 are provided to modulate signals fed to them in order to transmit the signals fed to them in modulated form by the transmission means 40 to the transmission means 30 in the communication station 1. In this case, the modulation means 45 are provided and designed for load modulation of the unmodulated carrier signal CS generated by the carrier signal generator 27 in the communication station 1, which has been known for a long time in specialist circles.

The data carrier 2 comprises a microcomputer 47. Instead of the microcomputer 47, a wired logical circuit could also be provided.

By aid of the microcomputer 47 decoding means 48 and encoding means 49 are realized. The decoding means 48 are downstream from the demodulation means 44 and are provided and designed for decoding the signals encoded by the encoding means 24 in the communication station 1, namely data signals. The encoding means 49 are upstream from the modulation means 45 and are provided and designed to encode signals fed to them and to be precise in such a way that the signals encoded by the encoding means 49 may be decoded by the decoding means 25 in the communication station 1.

In addition, by aid of the microcomputer 47 the communication means 50 of the data carrier 2 or the integrated circuit 41 are realized. The communication means 50 are designed for communication with at least one communication station in accordance with a communication sequence executed during a communication of this type, with the communication sequence comprising several communication steps, as has already been described in connection with the communication station 1. The communication means 50 comprise numerous means realized by the microcomputer 47, which are dealt with in more detail in the following.

The microcomputer 47 comprises sequence control means 51, by which numerous means may be controlled; these means are described in further detail in the following.

In addition, the microcomputer 47 comprises clock signal generating means 52, by which a clock signal CLK2 may be generated, which is fed to the sequence control means 51.

In addition, the microcomputer 47 comprises first memory means 53 and second memory means 54. The first memory means 53 are provided and designed inter alia to store data, namely to store data carrier data TDA and to store station data RDA. The second memory means 54 are provided and designed to store special information; this will be described in more detail in the following. In this case, the second memory means 54 are advantageously formed by a so-called FRAM.

By aid of the microcomputer 47 wake-up signal detection means 55 are realized to which the wake-up signal WUP may be fed and by which control information CI2 may be generated, which may be fed to the sequence control means 51.

In addition, by aid of the microcomputer 47 wake-up response signal generating means 56 are realized to which control information CI3 may be fed from the sequence control means 51 and by which the wake-up response signal UPR may be generated.

In addition, by aid of the microcomputer 47 first serial number inquiry signal detection means 57 may be realized to which the first serial number inquiry signal SNA1 may be fed and by which control information CI6 may be generated, which may be fed to the sequence control means 51.

In addition, by aid of the microcomputer 47 serial number signal generating means 58 are realized to which control information CI7 may be fed from the sequence control means 51 and by which the serial number signal SNS may be generated. In addition to the serial number data SND, the serial number signal SNS also comprises check sum data and additional security data.

In addition, by aid of the microcomputer 47 collision-display signal detection means 59 are realized to which the collision-display signal COL may be fed and by which control information CI11 may be generated, which may be fed to the sequence control means 51.

In addition, by aid of the microcomputer 47 a random number generator 60 being realized by which a random number may be generated, with, however, in this case, it only being possible to generate two random numbers through the agency, namely the random numbers "0" or "1". The random number "0" or "1" generated by the random number generator 60 may be fed as control information CI12 to the sequence control means 51.

In addition, by aid of the microcomputer 47 a counter 61 being realized whose function, namely whether its counter reading is to be incremented or decremented, may be controlled—on the one hand by the random number generator 60 and on the other by the second serial number inquiry signal detection means 62 by the microcomputer 47. By the counter 61, a counter reading ZS may be generated, which may be fed to the sequence control means 51, which in this case is great importance.

By aid of the microcomputer 47 the second serial number inquiry signal detection means 62 already mentioned above are realized, to which the second serial number inquiry signal SNA2 may be fed and by which control information CI14 may be generated, which may be fed to the sequence control means 51 and is used to control the counter 61.

In addition, by aid of the microcomputer 47 acknowledgment signal detection means 63 are realized to which the acknowledgment signal QIT may be fed and by which control information CI16 may be generated, which may be fed to the sequence control means 51.

In addition, by aid of the microcomputer 47 password inquiry signal generating means 64 are realized to which control information CI17 may be fed from the sequence control means 51 and by which the password inquiry signal PWA may be generated.

In addition, by the microcomputer 47 password signal detection means 65 are realized to which the password signal PWS may be fed and by which control information CI20 may be generated, which may be fed to the sequence control means 51.

In addition, by aid of the microcomputer 47 standby signal generating means 66 are realized to which control information CI21 may be fed from the sequence control means 51 and by which the standby signal BRS may be generated, which is fed not only to the encoding means 49 for transmission to the communication station 1, but also to the sequence control means 51, so it may be forwarded by the sequence control means 51 for use for another purpose; this will be described in more detail in the following, because this is of importance in this case.

In addition, by aid of the microcomputer 47 data processing means 67 are realized which are provided and designed for processing data. By the data processing means 67, data carrier data TDA and station data RDA may be processed.

In addition, by aid of the microcomputer 47 read command detection means 68 are realized to which the read command LCO may be fed and by which control information CI24 may be generated, which may be fed to the sequence control means 51.

In addition, by aid of the microcomputer 47 write command detection means 69 are realized to which the write command SCO may be fed and by which control information CI26 may be generated, which may be fed to the sequence control means 51.

In addition, by aid of the microcomputer 47 erase command detection means 70 are realized to which the erase command ECO may be fed and by which control information CI28 may be generated, which may be fed to the sequence control means 51. In addition, here erasing means 71 are provided, by which all the data and information previously stored in the second memory means 54 may be erased.

By aid of the microcomputer 47 other means are realized for example idle command detection means and other means, but these will not be dealt with in any more detail here.

As already mentioned above, the communication means 50 are realized by the microcomputer 47. In this case, the communication means 50 include the sequence control means 51 and the means 55 to 69 described individually in detail above.

The following describes a communication sequence between the communication station 1 in accordance with FIG. 1 and the data carrier 2 in accordance with FIG. 2. Here, express reference is made to the fact that this is an example for a communication sequence and that other communication sequences, which differ in certain communication steps from the communication sequence described in the following, are possible.

In principle, it should be established at this point that both with the communication station 1 and with data carrier 2, as a result of certain communication steps in the communication sequence described in the following, an intermediate operating state occurs and that both with the communication station 1 and with data carrier 2 significant intermediate operating state information occurs for each specific intermediate operating state. This fact is dealt with in more detail in the following.

It is assumed that the communication station 1 has been switched on and that the data carrier 2 in accordance with FIG. 2 in common with numerous other data carriers of this type is located in the communications area of the communication station 1. It is also mentioned that with the communication station 1 periodic deactivation of the communication station 1 is performed by the switching means 6—this is regardless of at which communication step the executed communication sequence is currently located—and that in the following every deactivation will be followed by re-activation of the communication station 1 by the switching means 6, with the deactivation resulting in an interruption of the transmission of an either unmodulated or modulated carrier signal CS to the data carrier 2, which has a result that for the period of the deactivation of the communication station 1, the voltage supply for the data carrier 2 fails and hence the supply voltage generating means 43 no longer output a sufficiently high supply voltage V for the data carrier 2 or for the integrated circuit 41 of the data carrier 2, which results in a change in the power-on-reset signal POR from a high level to a low level.

At the start of the communication sequence, the sequence control means 5 in the communication station 1 supply the control information CI1 to the wake-up signal generating means 9, which has a result that the wake-up signal WUP is transmitted by the communication station 1 to the data carrier 2 and detected by the wake-up signal detection means 55, so that the control information CI2 is supplied to the sequence control means 50. This has a result that the sequence control means 51 supply the control information CI3 to the wake-up response signal generating means 56, which has a result that the wake-up response signal UPR is generated and transmitted by the data carrier 2 to the communication station 1 and detected there by the wake-up response signal detection means 10. This has a result that the control information CI4 is supplied to the sequence control means 5. This informs the communication station 1 that at least one data carrier 2 has supplied a wake-up response signal UPR and hence is located in the communications area in the communication station 1.

As a result of the occurrence of the control information CI4, by the sequence control means 5 the control information CI5 is generated and sent to the first serial number inquiry signal generating means 11, resulting in the generation of the first serial number inquiry signals SNA1, with the first serial number inquiry signal SNA1 being transmitted by the communication station 1 to the data carrier 2 and detected by the first serial number inquiry signal detection means 57, so that the control information CI6 is generated and supplied to the sequence control means 51. This again has a result that the sequence control means 51 ensure that the serial number data SND is read from the first memory means 53, with the first memory means 53 being used to store the serial number data SND. The read-out serial number data SND are fed together with the control information CI7 generated from the sequence control means 51 to the serial number signal generating means 58, with, by the serial number data SND and by checksum data and other security data, the serial number signal SNS being formed, which is subsequently transmitted by the data carrier 2 to the communication station 1 and in the communication station 1 fed to the serial number signal detection means 12. By the collision detection means 13 contained in the serial number signal detection means 12, a check is then performed to determine whether a collision between at least two serial number signals SNS has taken place or not.

In the event that the serial number signal detection means 12 only received a single serial number signal SNS, the collision detection means 13 detect a collision, which has a result that the serial number data SND are supplied by the serial number signal detection means 12 to the sequence control means 5. In this case, the so-called anticollision procedure is already completed and a data carrier 2, whose serial number data SND is now known in the communication station 1, is inventoried in the communication station 1.

Figure 3:
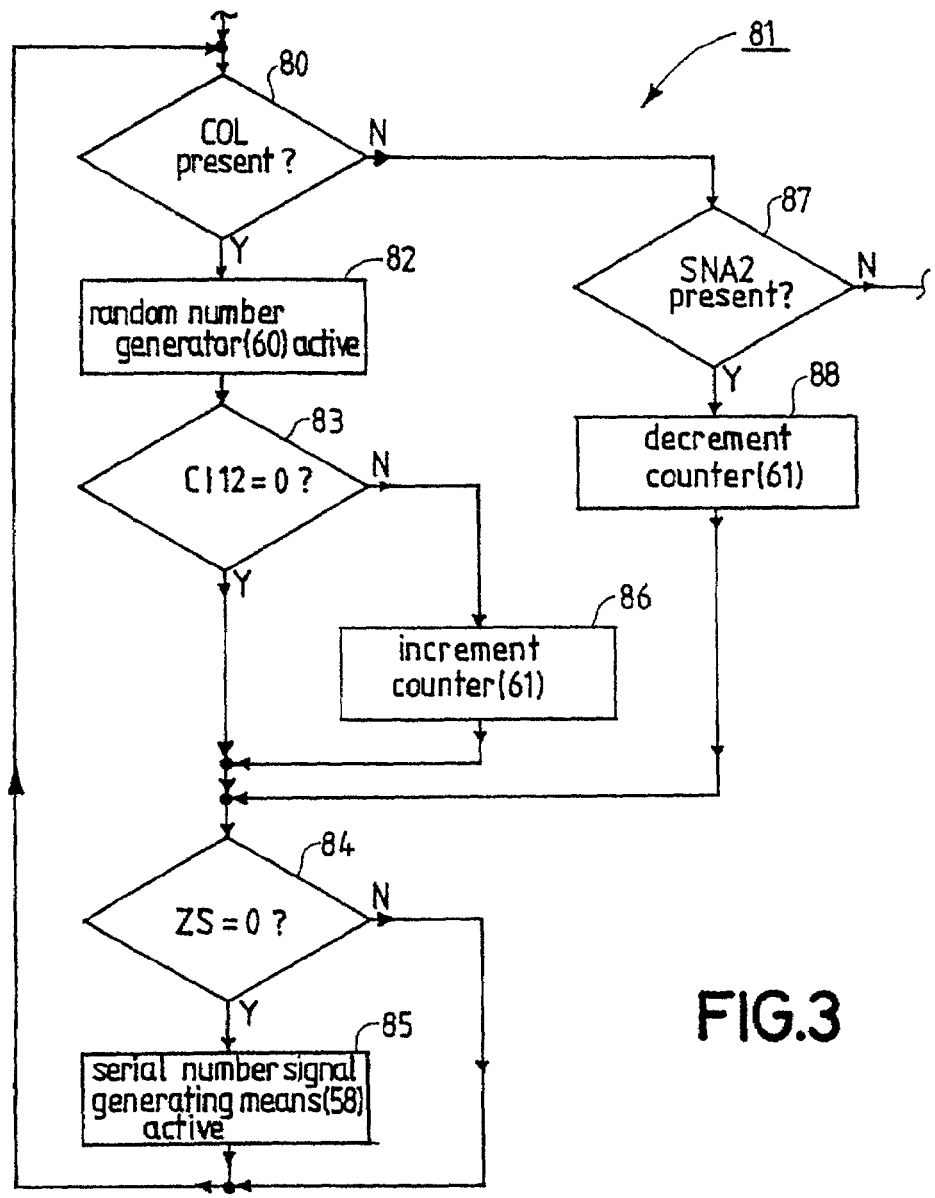
FIG. 3 shows a flow chart for a program sequence executed in the data carrier's sequence control means in accordance with FIG. 2.

In the event, however, that by the collision detection means 13 a collision is detected, which means that at least two serial number signals SNS were fed to the serial number signal detection means 12, this has a result that the serial number signal detection means 12 supplies the control information CI8 to the sequence control means 5. This again has a result that the sequence control means 5 generate the control information CI10 and feed it to the collision-display signal generating means 14, which has a result that the collision-display signal COL is generated and transmitted by the communication station 1 to the data carrier 2 and detected in the data carrier 2 by the collision-display signal detection means 59, as shown in block 80 of the flow diagram 81 according to FIG. 3.

This has a result that the collision-display signal detection means 59 generate the control information CI11 and supply it to the sequence control means 51, with the sequence control means 51 ensuring that the control information CI11 is forwarded to the random number generator 60. This has a result that the random number generator 60 becomes active, as shown in block 82 of the flow diagram 81. Upon this, the random number generator 60 generates one of the two possible random numbers "0" or "1" and supplies the random number generated as control information CI12 to the sequence control means 51. Following this, by the means in block 83 in the flow diagram 81, which are not shown, a check is performed to determine whether the control information CI12 generated by the random number generators 60 has the value "0" or the value "1".

If the previously generated random number has the value "0", by the other means, which are also not shown, a check is performed in block 84 in the flow diagram 81 to determine whether the counter reading ZS of the counter 61, with counter reading ZS being fed to the sequence control means 51, has the value "0". The counter 61 always has the value "0" after the generation of the power-on-reset signal POR on the first activation of the data carrier 2. As it was earlier assumed, that the random number "0" was determined in block 83 and the counter 61 still has its initial counter reading ZS, ie "0", this has a result that the check in block 84 has a positive result and that therefore after the check in block 84 by the means which are not shown, the generation of the control information CI7 is triggered, with the control information CI7 being fed to serial number signal generating means 58, so the serial number signal SNS is re-generated and transmitted to the communication station 1.

If now no collision occurs, this has a result that the serial number data SND are made available to the sequence control means 5. If a new collision occurs, this results in the re-generation of the collision display signal COL, which is again transmitted to the data carrier 2 and in accordance with the block 80 in the flow diagram 81 detected by the collision-display signal detection means 59.

If after the determination of a collision-display signal COL in block 80 and the subsequent generation of a random number as control information CI12, the random number "1" is generated, this has a result that the subsequent check in block 83 produces a negative check result, which has a result that in block 86, the counter 61 is incremented, ie the counter reading ZS is increased by 1. This has a result that the subsequent check in block 84 will also produce a negative check result, which again has a result that the serial number signal generating means 58 in block 85 is not activated. Therefore, in this case, despite the transmission of a collision-display signal COL by the communication station 1 to the data carrier 2, no serial number signal SNS is transmitted by the data carrier 2 to the communication station 1. Therefore, a specified period of time TV passes without the serial number signal detection means 12 in the communication station 1 receiving a serial number signal SNS, which is detected by the serial number signal detection means 12 or the collision detection means 13 contained therein and which has a result that the control information CI9 is generated and supplied to the sequence control means 5.

The occurrence of the control information CI9 in the sequence control means 5 has a result that the sequence control means 5 supply the control information CI13 to the second serial number inquiry signal generating means 15, so that the second serial number inquiry signal SNA2 is transmitted by the communication station 1 to the data carrier 2. The second serial number inquiry signal SNA2 is then detected in block 87 of the flow diagram 81 in accordance with FIG. 3 by the second serial number inquiry signal detection means 62, which has a result that the control information CI14 is generated and supplied to the sequence control means 51. This again has a result that the control information CI14 is forwarded from the sequence control means 51 to the counter 61 and here has a result that the counter 61 in block 88 in the flow diagram 81 is decremented. Under the assumption that the counter 61 was previously only incremented once in accordance with block 86, the decrementing in block 88 means that the counter reading ZS of the counter 61 is once again "0", which is determined subsequently in block 84. Consequently, in this case, the result is that in block 85 the serial number signal generating means 58 are activated by the control information CI7, so that the serial number signal SNS is generated and transmitted by the data carrier 2 to the communication station 1.

As may be seen from the diagram 81, the activation of the random number generator 60 in block 82 also takes place after the determination of the occurrence of a collision-display signal COL in block 80, which may lead to the incrementing of the counter 61 in block 86. In other words, this means that every counter reading ZS of the counter 61 deviating from "0" represents a measure for how far advanced the anticollision procedure is within the executed communication sequence. Several counter readings ZS may occur within an anticollision procedure, because several intermediate operating states may occur within an anticollision procedure. Therefore, every counter reading ZS characterizes an intermediate operating state of the data carrier 2 occurring during the course of the execution of the anticollision procedure and hence represents significant intermediate operating state information for a specific intermediate operating state within the anticollision procedure. Therefore, the counter reading ZS is significant intermediate operating state information, which in the data carrier 2 is fed to the second memory means 54 by the sequence control means 51 for storage. This means that current counter reading ZS in the counter 61 is always available in the second memory means 54. As in this case, the second memory means 54 is formed by a FRAM, the information stored therein is even retained if the voltage generating means 43 ceases to provide a sufficiently high supply voltage V.

In the event that after the reception of a second serial number inquiry signal SNA2 in the data carrier 2 in block 87, during the course of the further execution of the communication sequence in block 85, the serial number signal generating means 58 is activated and thereafter no further collisions occur, the result of this is that after the reception of the serial number signal SNS in the communication station 1, the serial number signal detection means 12 supplies the serial number data SND to the sequence control means 5. In this case, the so-called anticollision procedure is then completed and the serial number data SND are detected by the data carrier 2 after overcoming several collisions in the communication station 1 and inventoried in the communication station 1. In this case, the sequence control means 5 supply the control information CI15 to the acknowledgment signal generating means 16, so that the acknowledgment signal QIT is generated and transmitted to the data carrier 2. In the data carrier 2, the acknowledgment signal QIT is detected by the acknowledgment signal detection means 63, which has a result that the control information CI16 is generated and supplied to the sequence control means 51.

The control information CI16 also represents significant intermediate operating state information and to be precise the control information CI16 is significant for the intermediate operating state characterized in that an anticollision procedure is completed and the communication station 1 has notified the relevant data carrier 2 of this by the acknowledgment signal QIT. For this reason, the significant intermediate operating state information CI16 for the above-described intermediate operating state is also fed to the second memory means 54 by the sequence control means 51 and stored therein.

After the receipt of the control information CI16 in the sequence control means 51, the sequence control means 51 cause the control information CI17 to be fed to the password inquiry signal generating means 64, so that the password inquiry signal PWA is generated and transmitted by the data carrier 2 to the communication station 1 and detected there by the password inquiry signal detection means 17 resulting in the control information CI18 being sent to the sequence control means 5. This again has a result that the sequence control means 5 output the control information CI19 to the password signal generating means 18, which has a result that the password signal PWS is generated and transmitted by the communication station 1 to the data carrier 2 where it is fed to the password signal detection means 65. This has a result that the password signal detection means 65 compares the password data transmitted by the password signal PWS from the communication station 1 to the data carrier 2 with the password data stored in the data carrier 2. If the comparison produces a positive result, the password signal detection means 65 send the control information CI20 to the sequence control means 51. The control information CI20 also represents significant intermediate operating state information, because it indicates that a password procedure has been successfully completed, and therefore the control information CI20 is also fed by the sequence control means 51 to the second memory means 54 and stored therein.

The control information CI20 fed to the sequence control means 51 also has a result that the sequence control means 51 send the control information CI21 to the standby signal generating means 66 resulting in the generation of the standby signal BRS, with the standby signal BRS being transmitted to the communication station 1 where it is detected by the standby signal detection means 19, which again results in the control information CI22 being sent to the sequence control means 5. The standby signal BRS represents further significant intermediate operating state information, which signals that the data carrier 2 is ready for further communication steps, and therefore the standby signal BRS is also fed by the sequence control means 51 to the second memory means 54 for storage and stored in the second memory means 54.

Later on in the communication sequence, in the communication station 1 either a read command LCO may be generated by the read command generating means 21 or a write command SCO may be generated by the write command generating means 22. A read command LCO is detected after transmission by the communication station 1 to the data carrier 2 by the read command generating means 68 and results in the control information CI24, causing a read process to be performed, in which data carrier data TDA is read out of the first memory means 53 and transmitted to the communication station 1. After transmission by the communication station 1 to the data carrier 2 and detection by the write command detection means 69, a write command SCO results in the generation of the control information CI26, causing a write command to be performed, in which station data RDA is written to the second memory means 53.

As may be derived from the previous description of the communication sequence, during the course of the execution of the communication sequence, several communication steps are executed, with as a result of these communication steps an intermediate operating state occurring and with significant intermediate operating state information occurring for each specific intermediate operating state, namely in this case, the counter reading ZS and the control information CI16 and CI20 and the standby signal BRS. This intermediate operating state information is stored in the second memory means 54 by the sequence control means 51. Here, after the occurrence of information significant for intermediate operating states ZS, CI16, CI20 and BRS, the sequence control means 51 ensure that this intermediate operating state information ZS, CI16, CI20 and BRS is stored in the second memory means 54.

With the data carrier 2, the embodiment is designed so that the power-on-reset signal POR that may be generated by the power-on detection means 46 is also fed to the sequence control means 51. Here, the sequence control means 51 are designed so that on the first occurrence of the power-on-reset signal POR, all the means of the microcomputer 47 which may be controlled by the sequence control means 51 are changed to an initial state. If after such a change to the initial state, the supply voltage V fails, ie if the supply voltage V necessary for faultless operation is absent, the result in the data carrier 2 is that the execution of the communication sequence is interrupted, with, however, the significant intermediate operating state information stored in the second memory means 54 before this interruption being retained. If subsequently, the supply voltage V is restored, ie after the absence of the supply voltage V during the execution of the communication sequence the supply voltage V subsequently re-appears, the power-on detection means 46 re-send the power-on-reset signal POR, which is again fed to the sequence control means 51. In this case, however, the result of feeding the power-on-reset signal POR to the sequence control means 51 is that the data carrier 2 or the integrated circuit 41 is steered by the sequence control means 51, which are suitably designed for this, into an intermediate operating state, for which intermediate operating state information stored in the second memory means 54 is significant. In other words, this means that the data carrier 2 or the integrated circuit 41 may be steered with the assistance of the power-on detection means 46 and by the sequence control means 51 into an intermediate operating state belonging to significant intermediate operating state information stored in the second memory means 54. With data carrier 2 or the integrated circuit 41 in accordance with FIG. 2, the embodiment is designed here so that the data carrier 2 may be steered with the assistance of the power-on detection means 46 and by the sequence control means 51 into the intermediate operating state, whose significant intermediate operating state information was stored in the second memory means 54 as the last intermediate operating state information before the detection of the non-existence of the supply voltage V.

With the data carrier 2 and the integrated circuit 41 in accordance with FIG. 2, therefore, the significant advantage is obtained that after a failure of the supply voltage V and after a subsequent re-appearance of the supply voltage V, the data carrier 2 and the integrated circuit 41 may be immediately returned to the intermediate operating state prevailing in the data carrier 2 or in the integrated circuit 41 before the absence of the supply voltage V. This is of great importance particularly in connection with the storage of those intermediate operating states which occur during the course of the execution of the anticollision procedure, because it enables the anticollision procedure to be always continued with the intermediate operating states attained before the failure of the supply voltage V, which is advantageous with regard to a clear reduction of the overall time required for the execution of the anticollision procedure.

It should also be mentioned that in accordance with the above-described execution of the communication sequence by the communication station 1, the erase command ECO may also be generated by the erase command generating means 23. The erase command ECO may be detected in the data carrier 2 by the erase command detection means 70, with, after the detection of the erase commands ECO, the erase command detection means 70 sending the control information CI28. The control information CI28 is then fed to the erasing means 71, with the erasing means 71 acting by the sequence control means 51 on the second memory means 54 in such a way that the second memory means 54 is subject to an erase procedure, so that the intermediate operating state information ZS, CI16, CI20 and BRS which are significant for an intermediate operating state and stored in the second memory means 54 are erased.

Figure 4:
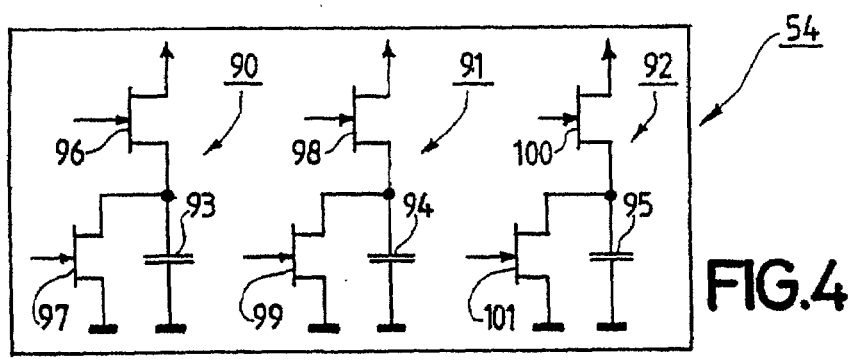
FIG. 4 shows the memory means for storing significant intermediate operating state information, which in this case, comprise memory stages with capacitive cells for an otherwise not shown data carrier in accordance with a second example of embodiment of the invention.

In the data carrier 2 in accordance with FIG. 2, the second memory means 54 are formed by a FRAM. Another option for the embodiment of second memory means 54 of this type is shown in FIG. 4. The second memory means 54 in accordance with FIG. 4 comprise three memory stages 90, 91 and 92. Each of the three memory stages 90, 91 and 92 comprises a capacitive cell 93, 94 and 95 and two field effect transistors 96, 97, 98, 99, 100 and 101. The three memory stages 90, 91 and 92 are suitable for the time-limited storage of each item of intermediate operating state information significant for an intermediate operating state. Here, the time-limited storage must be guaranteed for a period which is longer than the normal failures of the supply voltage V which occur during the normal operation of the data carrier 2 comprising the second memory means 54 in accordance with FIG. 4.

What is claimed is:

1. A data carrier (2) comprising communication means (50) for communication with at least one communication station (1) in accordance with a communication sequence executed during the communication, the communication sequence comprising several communication steps, and in the data carrier (2) an intermediate operating state occurs as a result of a communication step of specific communication steps, and in the data carrier (2) intermediate operating state information significant for an intermediate operating state of specific intermediate operating states (ZS, CI16, CI20, BRS) occurs, and the data carrier (2) comprising detection means (46) to detect the existence of at least one operating variable (V) required for the operation of the data carrier (2), and the data carrier (2) comprising memory means (54) for storing information, the memory means (54) being designed for storing the intermediate operating state information (ZS, CI16, CI20, BRS) significant for an intermediate operating state, and the data carrier (2) comprising memory control means (51) which are designed so that after the occurrence of an intermediate operating state information (ZS, CI16, CI20, BRS) significant for an intermediate operating state they ensure that this intermediate operating state information (ZS, CI16, CI20, BRS) significant for an intermediate operating state is stored in the memory means (54), and the data carrier (2) comprising control means (51), which are designed so that—after the detection of the non-existence of the at least one operating variable (V) during the interrupted execution of the communication sequence due to this non-existence of the at least one operating variable (V) and the subsequent detection of the re-existence of the at least one operating variable (V) by the detection means (46)—they ensure that the data carrier (2) is controlled in an intermediate operating state for which intermediate operating state an intermediate operating state information (ZS, CI16, CI20, BRS) stored in the memory means (54) is significant.

2. A data carrier (2) as claimed in claim 1 wherein the detection means (46) are designed for detecting the existence of a sufficiently high supply voltage (V) for the operation of the data carrier (2).

3. A data carrier (2) as claimed in claim 1 wherein the control means (51) are designed so that the data carrier (2) is controlled in this intermediate operating state for which intermediate operating state the significant intermediate operating state information (ZS, CI16, CI20, BRS) was stored as the last intermediate operating state information (ZS, CI16, CI20, BRS) in the memory means (54) before the detection of the non-existence of the at least one operating variable (V).

4. A data carrier (2) as claimed in claim 1 wherein the control means (51) are designed so that the data carrier (2) is controlled in at least one intermediate operating state occurring during the course of the execution of an anticollision procedure.

5. A data carrier (2) as claimed in claim 1 wherein the control means (51) are designed so that the data carrier (2) is controlled in an intermediate operating state occurring as a result of the execution of a password procedure.

6. A data carrier (2) as claimed in claim 1 wherein the memory means (54) being formed by a FRAM.

7. A data carrier (2) as claimed in claim 1 wherein the memory means (54) comprising at least two memory stages (90, 91, 92) each comprising a capacitive cell (93, 94, 95), and the two memory stages (P0, P1, P2) are suitable for the time-limited storage of the intermediate operating state information significant for an intermediate operating state.

8. A data carrier (2) as claimed in claim 1 comprising erasing means (71) by which erasing means (71) the memory means (54) can be erased in order to be able to delete the respective intermediate operating state information (ZS, CI16, CI20, BRS) significant for an intermediate operating state and stored in the memory means (54).

9. An integrated circuit (41) for a data carrier (2) comprising communication means (50) for communication with at least one communication station (1) in accordance with a communication sequence executed during the communication, the communication sequence comprising several communication steps, and in the integrated circuit (41) an intermediate operating state occurs as a result of a communication step of certain communication steps, and in the integrated circuit (41) intermediate operating state information significant for an intermediate operating step of specific intermediate operating states (ZS, CI16, CI20, BRS) occurs, and the integrated circuit (41) comprising detection means (46) to detect the existence of at least one operating variable (V) required for the operation of the integrated circuit (41), the integrated circuit (41), and the integrated circuit (41) comprising memory means (54) for storing information, the memory means (54) being designed for storing the intermediate operating state information (ZS, CI16, CI20, BRS) significant for an intermediate operating state, and the integrated circuit (41) comprising memory control means (51) which are designed so that after the occurrence of an intermediate operating state information (ZS, CI16, CI20, BRS) significant for an intermediate operating state they ensure that this intermediate operating state information (ZS, CI16, CI20, BRS) significant for an intermediate operating state is stored in the memory means (54), and the integrated circuit (41) comprising control means (51), which are designed so that—after the detection of the non-existence of the at least one operating variable (V) during the interrupted execution of the communication sequence due to this non-existence of the at least one operating variable (V) and the subsequent detection of the re-existence of the at least one operating variable (V) by the detection means (46)—they ensure that the integrated circuit (41) is controlled in an intermediate operating state for which intermediate operating state an intermediate operating state information (ZS, CI16, CI20, BRS) stored in the memory means is significant.

10. An integrated circuit (41) as claimed in claim 9 wherein the detection means (46) are designed so for detecting the existence of a sufficiently high supply voltage (V) for the operation of the integrated circuit (41).

11. An integrated (41) circuit as claimed in claim 9 wherein the control means (51) are designed so that the integrated circuit (41) is controlled in this intermediate operating state for which intermediate operating state the significant intermediate operating state information (ZS, CI16, CI20, BRS) was stored as the last intermediate operating state information (ZS, CI16, CI20, BRS) in the memory means (54) before the detection of the non-existence of the at least one operating variable (V).

12. An integrated circuit (41) as claimed in claim 9 wherein the control means (51) are designed so that the integrated circuit (41) is controlled in at least intermediate operating state occurring during the course of the execution of an anticollision procedure.

13. An integrated circuit (41) as claimed in claim 9 wherein the control means (51) are designed so that the integrated circuit (41) is controlled in an intermediate operating state as a result of the execution of a password procedure.

14. An integrated circuit (41) as claimed in claim 9 wherein the memory means (54) being formed by a FRAM.

15. An integrated circuit (41) as claimed in claim 9 wherein the memory means (54) comprising at least two memory stages (90, 91, 92) each comprising a capacitive cell (93, 94, 95), and the two memory stages (P0, P1, P2) are suitable for the time-limited storage of the intermediate operating state information significant for an intermediate operating state.

16. An integrated circuit (41) as claimed in claim 9 comprising erasing means (71) by which erasing means (71) the memory means (54) can be erased to be able to delete the respective intermediate operating state information (ZS, CI16, CI20, BRS) significant for an intermediate operating state and stored in the memory means (54).

* * * * *